(12) United States Patent
Litvinov et al.

(10) Patent No.: US 6,876,519 B1
(45) Date of Patent: Apr. 5, 2005

(54) MAGNETIC RECORDING HEAD INCLUDING BACKGROUND MAGNETIC FIELD GENERATOR

(75) Inventors: Dmitri Litvinov, Pittsburgh, PA (US); Sakhrat Khizroev, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 423 days.

(21) Appl. No.: 10/049,120

(22) PCT Filed: Sep. 19, 2000

(86) PCT No.: PCT/US00/25650
§ 371 (c)(1),
(2), (4) Date: Feb. 8, 2002

(87) PCT Pub. No.: WO01/22407
PCT Pub. Date: Mar. 29, 2001

Related U.S. Application Data
(60) Provisional application No. 60/154,880, filed on Sep. 20, 1999.

(51) Int. Cl.$^7$ ................................................ G11B 5/17
(52) U.S. Cl. .................................... 360/125; 360/123
(58) Field of Search ................................ 360/125, 126, 360/119, 123

(56) References Cited

U.S. PATENT DOCUMENTS

| | | |
|---|---|---|
| 4,138,702 A | 2/1979 | Magnenet |
| 4,438,471 A | 3/1984 | Oshiki et al. |
| 4,541,026 A | 9/1985 | Bonin et al. |
| 4,546,398 A | 10/1985 | Toda et al. |
| 4,575,777 A | 3/1986 | Hosokawa |
| 4,613,918 A | 9/1986 | Kanai et al. |
| 4,649,449 A | 3/1987 | Sawada et al. |
| 4,652,956 A | 3/1987 | Schewe |
| 4,731,157 A | 3/1988 | Lazzari |
| 4,742,413 A | 5/1988 | Schewe |
| 4,943,882 A | 7/1990 | Wada et al. |
| 4,974,110 A | 11/1990 | Kanamine et al. |
| 5,073,836 A | 12/1991 | Gill et al. |
| RE33,949 E | 6/1992 | Mallary et al. |
| 5,225,953 A | 7/1993 | Wada et al. |
| 5,687,046 A * | 11/1997 | Mathews ..................... 360/126 |
| 5,738,927 A | 4/1998 | Nakamura et al. |

FOREIGN PATENT DOCUMENTS

| | | |
|---|---|---|
| EP | 0 326 904 | 8/1989 |
| EP | 0362904 | 8/1989 |
| JP | 54128719 | 5/1979 |
| JP | 54128719 | 10/1979 |
| JP | 55055420 | 4/1980 |
| JP | 55080818 | 6/1980 |
| JP | 56087218 | 7/1981 |
| JP | 57033421 | 2/1982 |
| JP | 59195311 | 11/1984 |
| JP | 59231720 | 12/1984 |
| JP | 60059515 | 4/1985 |
| JP | 60124014 | 7/1985 |
| JP | 07105501 | 4/1995 |

OTHER PUBLICATIONS

Khizroev et al., U.S. Utility Patent Application Serial No. 09/757,433 Entitled "Perpendicular Magnetic Recording Head With Write Pole Which Reduces Flux Antenna Effect" Filed Jan. 10, 2001.

* cited by examiner

Primary Examiner—Robert S. Tupper
(74) Attorney, Agent, or Firm—Alan G. Towner, Esq.; Pietragallo, Bosick & Gordon

(57) ABSTRACT

A perpendicular recording head (10) for use with magnetic recording media (30) includes a main pole (14) and a magnetic field source which is positioned sufficiently close to the main pole tip to generate a background magnetic field in the recording media. A conductive magnetizing coil (20) surrounding the main pole is preferably used as the magnetic field source. The background magnetic field generated by the magnetizing coil effectively reduces the coercivity of the magnetic recording media in the region affected by the background field. The recording head enables writing on high coercivity/high anisotropy magnetic media, thereby achieving extremely high recording densities.

24 Claims, 5 Drawing Sheets

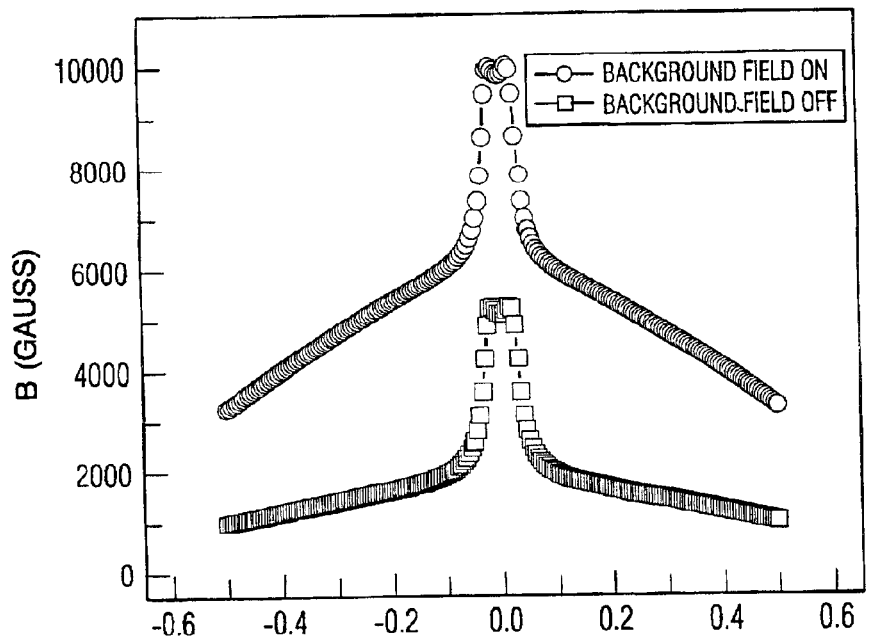
FIG. 6 DISTANCE FROM THE POLE TIP CENTER (μm)
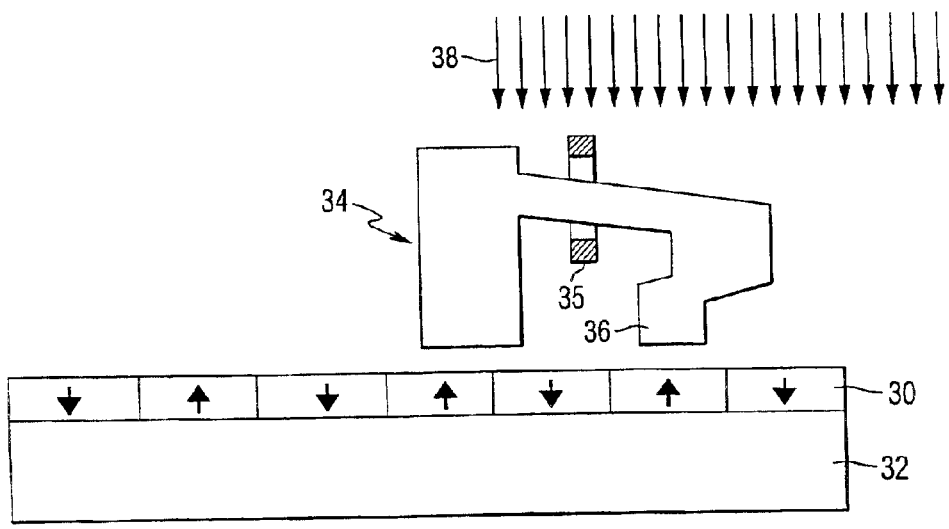
FIG. 7

MAGNETIC RECORDING HEAD INCLUDING BACKGROUND MAGNETIC FIELD GENERATOR

CROSS REFERENCE TO RELATED APPLICATION

This application is a National Stage (371) appl. of PCT/US00/25650, filed Sep. 9, 2000, which claims the benefit of U.S. Provisional Patent Application No. 60/154,880, filed Sep. 20, 1999.

FIELD OF THE INVENTION

The present invention relates to recording heads for use with magnetic storage media, and more particularly relates to a perpendicular recording head which generates a background magnetic field in the magnetic media.

BACKGROUND INFORMATION

Perpendicular magnetic recording heads have been developed for use in hard disk drive systems. Some examples of perpendicular recording heads are described in U.S. Pat. No. 4,438,471 to Ashiki et al., U.S. Pat. No. 4,541,026 to Bonin et al., U.S. Pat. No. 4,546,398 to Toda et al., U.S. Pat. No. 4,575,777 to Hosokawa, U.S. Pat. No. 4,613,918 to Kanai et al., U.S. Pat. No. 4,649,449 to Sawada et al., U.S. Pat. No. 4,731,157 to Lazzari, U.S. Pat. No. 4,974,110 to Kanamine et al., and U.S. Pat. No. 5,738,927 to Nakamura et al.

In order to increase the data storage density of hard disk drives, the use of magnetic media having increased magnetic anisotropy has been proposed. However, highly anisotropic media exhibit extremely high coercivities, e.g., well over 5,000 Oe. Conventional perpendicular magnetic recording heads are not capable of recording on media having such high coercivities.

The present invention has been developed in view of the foregoing, and to address other deficiencies of the prior art.

SUMMARY OF THE INVENTION

The present invention provides a magnetic recording head for use with magnetic recording media having a magnetic field generating coil configured and positioned to generate a background magnetic field in the magnetic recording media.

The magnetic recording head preferably comprises a perpendicular configuration. In accordance with the present invention, the perpendicular recording head generates a supplemental magnetic field which increases the magnetic recording field in comparison with conventional perpendicular recording heads. Although not limited to such use, perpendicular recording heads of the present invention are particularly useful for computer hard disk drives.

A typical perpendicular recording head includes a main pole, an opposing pole magnetically coupled to the main pole, and an electrically conductive magnetizing coil surrounding the main pole. The bottom of the opposing pole will typically have a surface area greatly exceeding the surface area of the tip of the main pole. In a preferred embodiment, electrical current flowing through the magnetizing coil creates a flux through the main pole tip and also generates the background magnetic field in the recording media.

A typical magnetic recording medium for use in conjunction with the present perpendicular recording head includes an upper layer having multiple magnetically permeable tracks separated by nonmagnetic transitions, and a magnetically permeable lower level. The lower level is magnetically soft relative to the tracks.

To write to the magnetic recording medium, the recording head is separated from the magnetic recording medium by a distance known as the flying height. The magnetic recording medium is moved past the recording head so that the recording head follows the tracks of the magnetic recording medium, with the magnetic recording medium first passing under the opposing pole and then passing under the main pole. Current is passed through the coil to create magnetic flux within the main pole. The magnetic flux will pass from the main pole tip through the track, into the lower layer, and across to the opposing pole. In addition to the magnetic field generated at the main pole tip, a supplemental magnetic field is generated in accordance with the present invention. The combined magnetic flux from the pole tip and from the coil causes the magnetic fields in the tracks to align with the magnetic flux of the recording head. Changing the direction of electric current changes the direction of the flux created by the recording head and therefore the magnetic fields within the magnetic recording medium.

An aspect of the present invention is to provide a perpendicular recording head including a main pole having a tip, and an electrically conductive magnetizing coil positioned sufficiently close the main pole tip to generate a background magnetic field in the magnetic recording medium when current is passed through the magnetizing coil.

Another aspect of the present invention is to provide a magnetic recording apparatus comprising a magnetic recording medium and a recording head. The magnetic recording medium includes an upper layer having a plurality of data storage tracks, and a lower layer being magnetically soft relative to the data storage tracks. The recording head includes a main pole having a tip, and an electrically conductive magnetizing coil positioned sufficiently close the main pole tip to generate a background magnetic field in the magnetic recording medium when the recording head is positioned at a flying height above the magnetic recording medium and current is passed through the magnetizing coil.

A further aspect of the present invention is to provide a method of storing data on a magnetic storage medium. The method includes the steps of providing a magnetically permeable main pole, providing a magnetic storage medium adjacent the main pole, directing magnetic flux from the main pole toward the magnetic storage medium, and additionally generating a background magnetic field in the magnetic storage medium.

These and other aspects of the present invention will be more apparent from the following description.

BRIEF DESCRIPTION OF THE DRAWINGS

FIG. 6 is a graph comparing magnetic flux density of a perpendicular recording head with and without the generation of a background magnetic field.

FIG. 7 is partially schematic side sectional view of a test apparatus for generating a background magnetic field in accordance with the present invention.

DETAILED DESCRIPTION

The preferred embodiment of the present invention provides a perpendicular recording head for use with magnetic recording media. As used herein, "recording head" means a head adapted for read and/or write operations.

The present invention has been developed in order to overcome certain problems with conventional hard disk drive systems. Granular magnetic recording media used in such systems is subject to superparamagnetic instabilities when the anisotropy energy of the grains ($K_u \times V$, where V is the grain volume) becomes comparable to the energy of thermal fluctuations, kT. Improvements in recording densities requires continuous refinement of the grain size. Higher anisotropy materials are desirable in order to keep the media thermally stable. As an example, the L10 phase of $Co_{50}Pt_{50}$ has an anisotropy energy $K_u = 4 \times 10^6$ J/m$^3$ (compare with $K_u = \sim 10^5$ J/m$^3$ for CoCr media). Such high anisotropy reduces the critical size at which grains become thermally unstable to less than 1 nm. Utilizing these materials for recording media can potentially extend the recording densities well beyond 100 Gbit/in$^2$. However, a major obstacle preventing utilization of high anisotropy media is that such media exhibit exceptionally high coercivities, e.g., in excess of 5,000 Oe.

Figure 1:
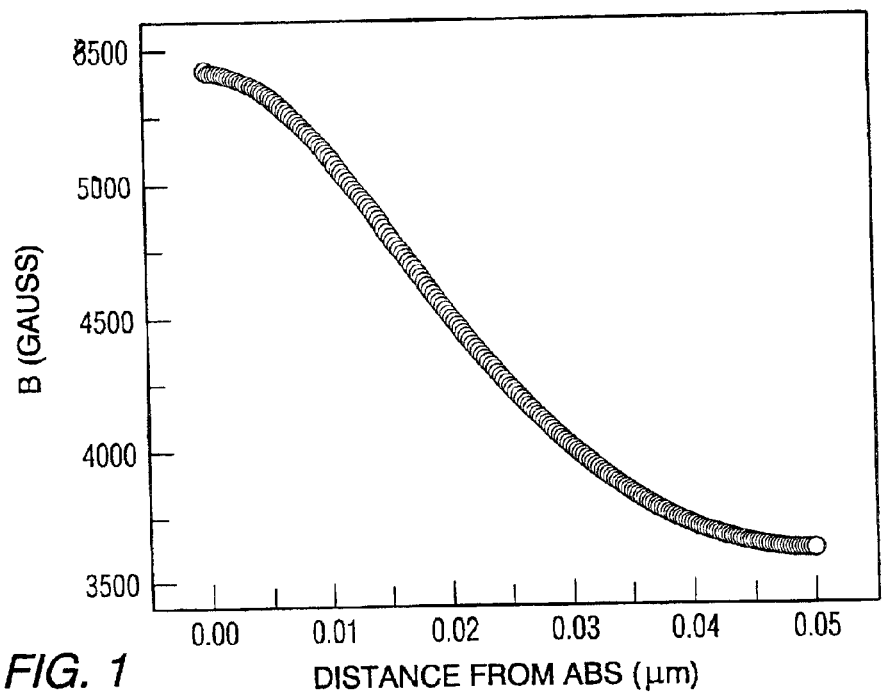
FIG. 1 is a graph of magnetic field strength versus distance from the air bearing surface of a conventional perpendicular recording head, illustrating a substantial drop-off in magnetic field strength as the distance is increased.

The magnitude of the fields generated by conventional perpendicular recording heads is limited by the saturation moment of the yoke material. FIG. 1 is a graph illustrating the dependence of magnet field strength on the distance from the pole tip or air-bearing surface (ABS) for a conventional single-pole perpendicular head utilizing FeAlN (saturation moment of 2Tesla) as the pole material. At distances greater than 15 nm from the ABS, the field drops below 5,000 Oe. This arrangement is therefore not sufficient for recording on media with coercivities of 5,000 Oe and higher.

Figure 2:
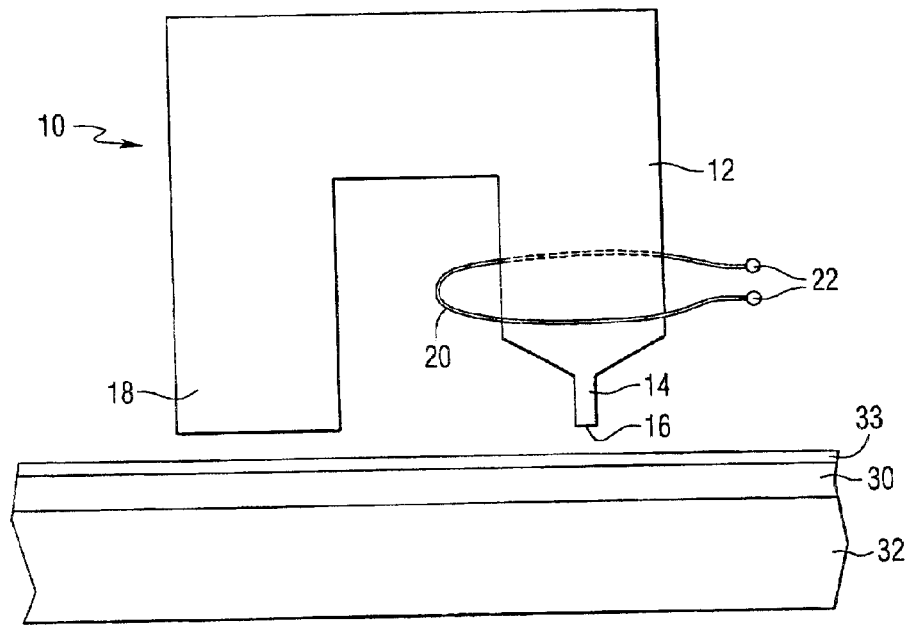
FIG. 2 is a partially schematic side sectional view of a perpendicular recording head including a background magnetic field-generating coil in accordance with an embodiment of the present invention.

FIG. 2 schematically illustrates a single pole perpendicular recording head 10 in accordance with an embodiment of the present invention. The perpendicular recording head 10 includes a yoke 12 made of magnetically permeable material such as NiFe, CoZrNb, CoZrTa, CoNiFe, FaAlN, FeTaN, CoFe, CoFeB or any other soft magnetic materials, including multiple layers or laminates of such materials. A main pole 14 extends from the yoke 12 and includes a main pole tip 16. The main pole 14 may be made of any suitable magnetically permeable material such as NiFe, FeAlN, FeTaN, CoFe, CoFeB, CoFeN or any other soft magnetic materials, including multiple layers of such materials. An opposing pole 18 is magnetically coupled to the main pole 14. In accordance with the present invention, an electrically conductive magnetizing coil 20 surrounds the yoke 12 and main pole 14. As shown in FIG. 2, the magnetizing coil 20 is located close to the main pole tip 16. Electrical current is supplied to the coil 20 through electrical connections 22. The magnetizing coil 20 may be made of any suitable electrically conductive material, such as Cu, Ag, Au or any other high conductivity materials or alloys.

As shown in FIG. 2, the perpendicular recording head 10 is positioned above a magnetic storage media including a hard magnetic recording layer 30 and a soft magnetic underlayer 32. A protective overcoat 33 such as diamond-like carbon is applied over the recording layer 30. During recording operations, the magnetic media moves in the direction of the arrow shown in FIG. 2.

The recording layer 30 may be made of any suitable hard magnetic material such as CoCrPt, CoCrPtTa, CoCrPtB, CoCrPtTaNb or other high anisotropy hexagonal Co-containing alloys. The recording layer 30 may also be made of CoPt, FePt, CoPd, FePd or other high anisotropy L10 materials. High anisotropy materials such as Co/Pd, CoB/Pd, CoCr/Pd, CoCrPt/Pd, CoCrPd/Pt, CoB/Pt, Co/Pt, CoCr/Pt, Fe/Pd and Fe/Pt may also be used as the recording layer 30. Furthermore, high anisotropy ferrites such as Ba ferrite may be used as the recording layer 30. Preferred materials for the recording layer 30 include L10 materials such as CoPt, FePt, CoPd and FePd, and multilayers of Co/Pt and Co/Pd. The recording layer may have a relatively high anisotropy energy $K_u$, e.g., greater than about $10^6$ J/m$^3$. For example, recording layers having anisotropy energy $K_u$ levels of from about $10^6$ to about $10^8$ $\mu$m$^3$ may be used. The recording layer may also have a relatively high coercivity above 5,000 Oe, e.g., above 8,000 or 10,000 Oe. The underlayer 32 may be made of any suitable soft magnetic material, such as FeAlN, FeTaN, CoFe, CoFeB, CoFeN or other high moment soft magnetic materials or soft magnetic films comprising multiple layers of such materials.

Figure 3:
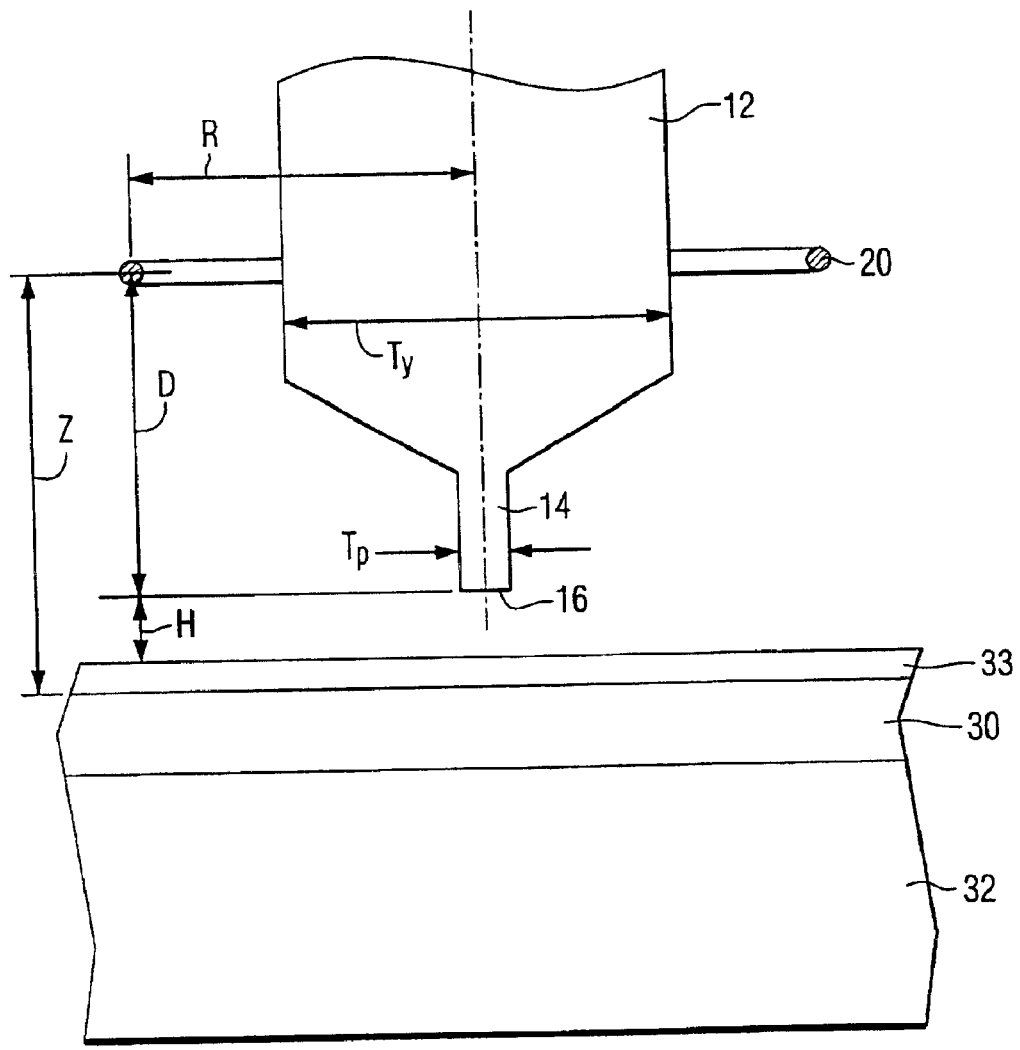
FIG. 3 is an enlarged view of a portion of the recording head of FIG. 2.

FIG. 3 is an enlarged view of a portion of the perpendicular recording head 10 of FIG. 2, showing dimensional details of the yoke 12, main pole 14 and magnetizing coil 20. The magnetizing coil 20 has a radial dimension R measured from the center of the yoke 12 or the longitudinal axis of the main pole 14. The coil 20 is located at a distance D from the main pole tip 16, measured in a direction parallel with the longitudinal axis of the main pole 14 (normal to the surface of the recording layer 30). The main pole tip 16 is located at a flying height H above the upper surface of the protective layer 33. The main pole tip 16 preferably forms part of the air bearing surface of the recording head 10. The magnetizing coil 20 is positioned at a distance Z from the upper surface of the recording layer 30, measured in a direction parallel with the longitudinal axis of the main pole 14. The distance Z is equal to the sum of the distances D and H, plus the thickness of the protective layer 33. As further shown in FIG. 3, the yoke 12 has a thickness $T_y$ which is preferably larger than the thickness $T_p$ of the main pole 14.

The dimensions R, D, H, Z, $T_y$ and $T_p$ are preferably selected in accordance with the present invention to produce a sufficient background magnetic field in the recording layer 30 when current flows through the coil 20. For many perpendicular recording head configurations, R preferably ranges from about 0.1 to about 5 micron, D ranges from about 0.1 to about 5 micron, H ranges from zero to about 0.1 micron, and Z ranges from about 0.1 to about 5 micron. The yoke thickness $T_y$ may typically be from about 0.1 to about 5 micron, preferably from about 0.1 to about 1 micron. The main pole thickness $T_p$ may be from about 0.01 to about 0.5 micron, preferably from about 0.01 to about 0.1 micron.

In accordance with the present invention, the ratio of the coil radial dimension R to the distance D is preferably controlled in order to generate the desired background magnetic field in the recording layer 30, as more fully described below. The ratio of R:D typically ranges from about 1:1 to about 10:1, preferably from about 1:1 to about 5:1. The ratio of the yoke thickness $T_y$ to the pole thickness $T_p$ is also controlled. The ratio of $T_y$:$T_p$ preferably ranges from about 1:1 to about 10:1. More preferably, the ratio of $T_y$:$T_p$ ranges from about 2:1 to about 5:1.

Although the magnetizing coil 20 shown in FIGS. 2 and 3 comprises a single circular winding, multiple windings and/or other coil shapes may be used. For example, the coil 20 may alternatively be square, rectangular, helical, straight, etc. Similarly, the cross-sectional shapes of the yoke 12 and main pole 14 may be round, square, rectangular, or the like. The magnetizing coil 20 preferably surrounds the yoke 12 and main pole 14 as shown in FIGS. 2 and 3. However, the coil could be located at a different position on the head 10 as long as a sufficient background magnetic field is generated. Furthermore, although not preferred, a permanent magnet could be used in place of, or in addition to, the coil 20.

Figure 4:
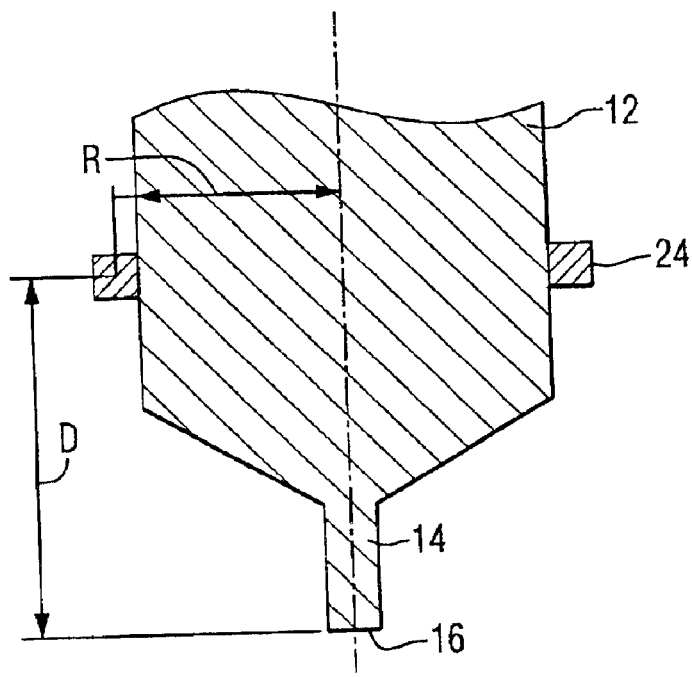
FIG. 4 is a partially schematic side sectional view of a perpendicular recording bead pole tip and magnetic coil configuration in accordance with an embodiment of the present invention.
Figure 5:
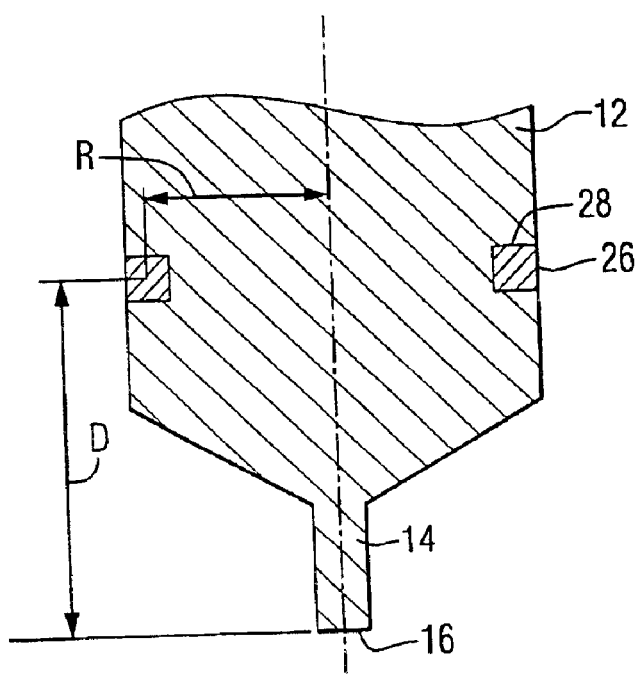
FIG. 5 is a partially schematic side sectional view of a perpendicular recording head pole tip and magnetic coil configuration in accordance with another embodiment of the present invention.

FIGS. 4 and 5 schematically illustrate alternative coil configurations in accordance with the present invention. In the embodiment shown in FIG. 4, an electrically conductive magnetizing coil 24 surrounds and is positioned directly adjacent the outer surface of the yoke 12. In the embodiment shown in FIG. 5, an electrically conductive magnetizing coil 26 surrounds and is embedded in a recess 28 which extends around the outer surface of the yoke 12. In FIGS. 4 and 5, each of the magnetizing coils 24 and 26 is shown as a single winding around the yoke 12. Alternatively, multiple coil windings may be used. Although the magnetizing coils 24 and 26 shown in FIGS. 4 and 5 have square cross sections, any other suitable sectional shape may be used, such as rectangular, circular, etc. The cross-sectional thickness of the magnetizing coils 20, 24 and 26 typically ranges from about 0.01 to about 5 micron, preferably from about 0.1 to 2 micron.

In the embodiments shown in FIGS. 2–5, the pole tip 16 comprises a flat surface. Alternatively, the present design can be combined with a perpendicular head having a concave pole tip design, such as the concave pole tips described in U.S. patent application Ser. No. 09/665,598, filed Sep. 19, 2000 entitled Perpendicular Recording Head Including Concave Tip, which is incorporated herein by reference.

In accordance with the present invention, the amount of electrical current supplied to the magnetizing coil 20 is controlled in order to generate the desired background magnetic field strength at the recording layer 30, the background magnetic field is typically greater than 100 Gauss, preferably greater than 1,000 or 2,000 Gauss. Depending upon the magnetic properties of the recording layer 30, the background magnetic field may typically range from about 100 to about 20,000 Gauss, preferably from about 1,000 to about 15,000 Gauss, and more preferably from about 5,000 to about 10,000 Gauss at the recording layer 30. The background magnetic field effectively decreases the coercivity of the recording layer 30. The coercivity of the recording layer 30 may be defined as $H_c$, and the background magnetic field effectively decreases the coercivity $H_c$ to a lower value defined as $H_b$. The ratio of $H_b$:$H_c$ preferably ranges from about 1:10 to about 9:10, more preferably from about 3:10 to about 8:10. In a particularly preferred embodiment, the ratio of $H_b$:$H_c$ is about 5:10.

In accordance with a further aspect of the present invention, the level of the background magnetic field $H_b$ is controlled in relation to the strength of the magnetic field $H_p$ generated at the main pole tip 16. Preferably, the ratio of $H_b$:$H_p$ is from about 1:10 to about 10:1, more preferably from about 4:10 to about 3:1. As a particular example, a recording layer having a coercivity of 10,000 Oe may be written on with a recording head of the present invention which generates a pole tip coercivity $H_p$ of 5,000 Oe and a background coercivity $H_b$ of 8,000 Oe. Thus, while the magnetic flux generated from the pole tip would not be sufficient to write on the recording layer alone, the background magnetic field is sufficient to effectively reduce the dynamic coercivity of the recording layer, thereby enabling writing on the recording layer.

As long as the pole tip is not completely saturated, the magnetic flux is mainly concentrated within the pole tip. A standard way of operating a single pole head is to choose a current value SAT that causes complete saturation of the pole tip. The fields generated by the saturated pole are localized and their gradients within the recording layer determine the minimum bit cell size. If the current in the coil is further increased by $\Delta I$ ($\Delta I = I - I_{SAT}$), the extra flux generated will no longer be confined to the pole tip. The magnitude of the additional field AB will be proportional to $\Delta I$. The field flux will be spread over a significantly larger region within the recording layer, the size of which is determined by the diameter of the coil due to the relative proximity of the coil to the recording layer. The magnitude of $\Delta B$ can be fine-tuned by the current in the coil. For a single turn coil the magnitude of $\Delta B$ is given by:

$$\Delta B = \frac{\mu_0 \Delta I}{2} \frac{R^2}{(R^2 + z^2)^{3/2}},$$

where R is the radius of the coil and z is the distance from the coil to the hard layer. For R=0.2 $\mu$m and z=0.1 $\mu$m, background fields in excess of 1Tesla (10,000 Oe) can be generated with currents as small as 400 mA with a resolution of about 25 Oe/mA if a single turn coil is used.

The presence of the additional background field AB effectively reduces coercivity of the recording layer. It enables writing on high coercivity media using heads based on available soft materials. Because of high data rates, the dynamic coercivity will be affected by the introduction of such background field because the dynamic coercivity is significantly higher than the static coercivity.

FIG. 6 illustrates magnetic field simulation results using a boundary element solver, Amperes, for different values of coil current. The field profiles at I=50 mA (=$I_{SAT}$) and I=200 mA ($\Delta I$=150 mA) are given. The additional 150 mA of current on top of the saturation current $I_{SAT}$ generates a background field of 4,000 Oe. This background field would not be high enough to erase the previously recorded bit pattern, but it effectively increases the write field of the pole tip, i.e., decreases the effective media coercivity.

Figure 8:
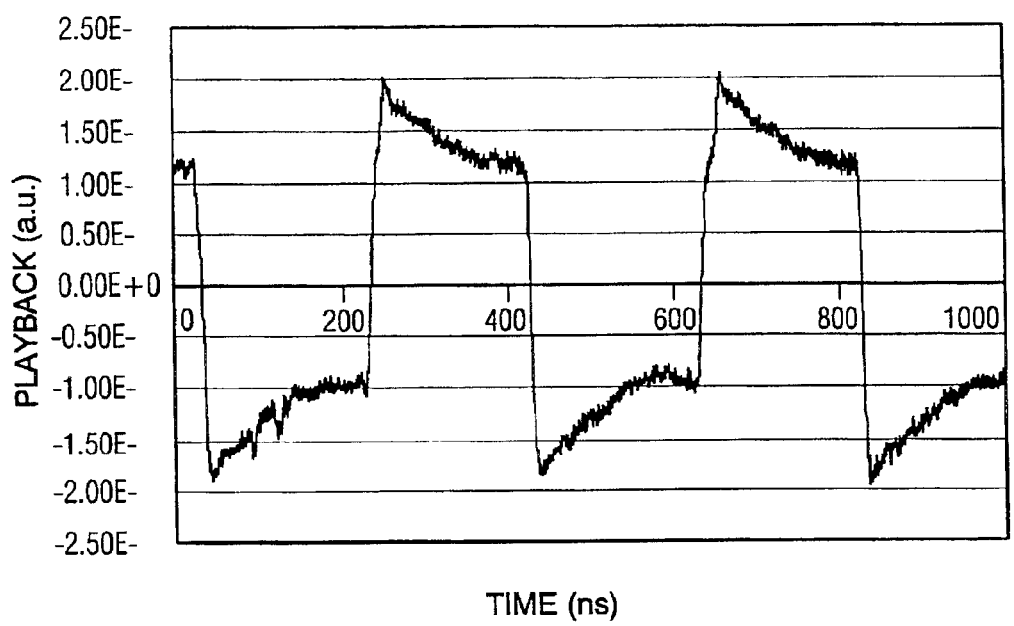
FIG. 8 is a graph of playback level versus time, showing the effectiveness of the test apparatus illustrated in FIG. 7.

A test was conducted to confirm the performance of the present design. FIG. 7 schematically illustrates the test. A conventional perpendicular writer 34 having a magnetic coil 35 placed far from the pole tip 36 or the air bearing surface of the writer was used in combination with an external field source 38 (a strong rare earth-based permanent magnet that could generate stray fields in excess of 2,000 Oe) to simulate a background field from a coil if the coil was placed in close proximity to the ABS. The recording tests were conducted on a multilayer perpendicular media 30 comprised of twenty layers of Co/Pd on a soft underlayer of FeAlN, having a coercivity in excess of 8,000 Oe. First, the media was DC saturated (DC erased) in a strong magnetic field generated using a large electromagnet. As expected, due to demagnetizing fields, no stray field emanates from the DC saturated media, resulting in zero signal read-out. Next, recording with a conventional perpendicular writer was attempted, which failed due to insufficient magnitude of the recording field. The recording failure was confirmed by the absence of the read-out signal. Finally, a small permanent magnet was placed above the recording head in close proximity to the media, as schematically illustrated in FIG. 7, and another recording attempt was performed. The result was a well-recorded bit pattern with the playback shown in FIG. 8. The results shown in FIG. 8 demonstrate that the anisotropy of the recording media is effectively temporarily lowered by the application of the background magnetic field.

The present recording system effectively reduces the coercivity of the media. This is accomplished by generating a background field utilizing a magnetizing coil which is placed in proximity to the recording layer. This recording system enables writing on high coercivity/high anisotropy media that can support very high recording densities, e.g., in excess of 100 Gbit/in$^2$. High recording densities can therefore be achieved without the necessity of major changes in the recording process.

Whereas particular embodiments of this invention have been described above for purposes of illustration, it will be evident to those skilled in the art that numerous variations of the details of the present invention may be made without departing from the invention as defined in the appended claims.

What is claimed is:

1. A perpendicular recording head for use with a magnetic recording medium, the perpendicular recording head comprising:
    a main pole having a tip;
    a yoke connected to the main pole having a thickness greater than a thickness of the main pole; and
    an electrically conductive magnetizing coil at least partially surrounding the yoke and positioned sufficiently close to the main pole tip to generate a background magnetic field in the magnetic recording medium when current is passed through the magnetizing coil, wherein the current passed through the magnetizing coil is sufficient to cause magnetic saturation of the main pole tip, and the combination of a magnetic field generated from the saturated main pole tip and the background magnetic field is sufficient to write on the magnetic recording medium.

2. The perpendicular recording head of claim 1, wherein the magnetizing coil at least partially surrounds the main pole.

3. The perpendicular recording head of claim 2, wherein the magnetizing coil comprises a single winding around the main pole.

4. The perpendicular recording head of claim 1, wherein the magnetizing coil is spaced apart from an outer surface of the yoke.

5. The perpendicular recording head of claim 1, wherein the magnetizing coil is positioned directly adjacent an outer surface of the yoke.

6. The perpendicular recording head of claim 1, wherein the magnetizing coil is at least partially embedded in an outer surface of the yoke.

7. The perpendicular recording head of claim 1, wherein the ratio of the yoke thickness to the main pole thickness is less than about 10:1.

8. The perpendicular recording head of claim 1, wherein the ratio of the yoke thickness to the main pole thickness is from about 2:1 to about 5:1.

9. The perpendicular recording head of claim 2, wherein the magnetizing coil has a radial dimension R measured from an axis defined by the main pole, the magnetizing coil has a pole tip distance D measured from the magnetizing coil to the pole tip in a direction parallel with the main pole axis, and the ratio of R:D is from about 1:1 to about 10:1.

10. The perpendicular recording head of claim 9, wherein the ratio of R:D is from about 1:1 to about 10:1.

11. The perpendicular recording head of claim 9, wherein the radial dimension R is from about 0.1 to about 5 micron.

12. The perpendicular recording head of claim 9, wherein the pole tip distance D is from about 0.1 to about 5 micron.

13. The perpendicular recording head of claim 1, wherein the background magnetic field is greater than 100 Gauss.

14. The perpendicular recording head of claim 1, wherein the background magnetic field is greater than 1,000 Gauss.

15. The perpendicular recording head of claim 1, wherein the background magnetic field is greater than 2,000 Gauss.

16. The perpendicular recording head of claim 1, wherein the background magnetic field is from about 5,000 to about 10,000 Gauss.

17. The perpendicular recording head of claim 1, wherein the background magnetic field has a strength $H_b$, a magnetic field generated at the main pole tip has a strength $H_p$, and the ratio of $H_b$:$H_p$ is from about 1:10 to about 10:1.

18. The perpendicular recording head of claim 17, wherein the ratio of $H_b$:$H_p$ is from about 4:10 to about 3:1.

19. A magnetic recording apparatus, comprising:
    a magnetic recording medium including an upper layer having a plurality of data storage tracks, and a lower layer being magnetically soft relative to the data storage tracks; and
    a recording head including a main pole having a tip, a yoke connected to the main pole having a thickness greater than a thickness of the main pole, and an electrically conductive magnetizing coil at least partially surrounding the yoke and positioned sufficiently close the main pole tip to generate a background magnetic field in the magnetic recording medium when the recording head is positioned at a flying height above the magnetic recording medium and current is passed through the magnetizing coil, wherein the current passed through the magnetizing coil is sufficient to cause magnetic saturation of the main pole tip, and the combination of a magnetic field generated from the saturated main pole tip and the background magnetic field is sufficient to write on the magnetic recording medium.

20. The magnetic recording apparatus of claim 19, wherein the magnetizing coil at least partially surrounds the main pole.

21. The magnetic recording apparatus of claim 20, wherein the magnetizing coil has a radial dimension R measured from an axis defined by the main pole, the magnetizing coil has a pole tip distance D measured from the magnetizing coil to the pole tip in a direction parallel with the main pole axis, and the ratio of R:D is from about 1:1 to about 10:1.

22. The magnetic recording apparatus of claim 20, wherein the background magnetic field has a strength $H_b$, a magnetic field generated at the main pole tip has a strength $H_p$, and the ratio of $H_b$:$H_p$ is from about 1:10 to about 10:1.

23. The magnetic recording apparatus of claim 19, wherein the magnetizing coil generates a magnetic field at the main pole tip in addition to the background magnetic field that is generated when the current is passed through the magnetizing coil.

24. A method of storing data on a magnetic storage medium, the method comprising the steps of:
    providing a magnetically permeable main pole having a tip;

providing a yoke connected to the main pole having a thickness greater than a thickness of the main pole;

providing an electrically conductive magnetizing coil at least partially surrounding the yoke adjacent to the main pole tip;

providing a magnetic storage medium adjacent the main pole tip;

passing current through the magnetizing coil sufficient to cause magnetic saturation of the main pole tip;

directing a magnetic field from the saturated main pole tip toward the magnetic storage medium; and additionally generating a background magnetic field in the magnetic storage medium from the magnetizing coil, wherein the combination of the magnetic field from the saturated main pole tip and the background magnetic field is sufficient to write on the magnetic recording medium.

* * * * *

UNITED STATES PATENT AND TRADEMARK OFFICE
CERTIFICATE OF CORRECTION

PATENT NO. : 6,876,519 B1 Page 1 of 1
APPLICATION NO. : 10/049120
DATED : April 5, 2005
INVENTOR(S) : Dimitri Litvinov and Sakhrat Khizroev It is certified that error appears in the above-identified patent and that said Letters Patent is hereby corrected as shown below:

Title Page: #56
Foreign Patent Documents
Delete "EP 0362904 8/1989"
Delete "JP 54128719 5/1979"

Col. 1 line 8
Cross Reference to Related Application
"Sep. 9, 2000" should read -- Sep. 19, 2000 --.

Column 2, line 65, "bead" should read --head--.

Column 4, line 25, " $10^8$ μm$^3$ " should read -- $10^8$ J/m$^3$ --.

Column 5, line 48, "layer 30, the background" should read --layer 30. The background --.

Column 6, line 15, "SAT" should read -- |$_{SAT}$ --.

Column 6, line 21, "AB" should read -- ΔB --.

Column 6, line 37, "AB" should read -- ΔB --.

Signed and Sealed this

Fifth Day of September, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,876,519 B1 | Page 1 of 1 |
| APPLICATION NO. | : 10/049120 | |
| DATED | : April 5, 2005 | |
| INVENTOR(S) | : Dmitri Litvinov and Sakhrat Khizroev | |

It is certified that error appears in the above-identified patent and that said Letters Patent is hereby corrected as shown below:

<u>Title Page:</u> #56
<u>Foreign Patent Documents</u>
Delete "EP  0362904  8/1989"
Delete "JP  54128719  5/1979"

Col. 1 line 8
<u>Cross Reference to Related Application</u>
"Sep. 9, 2000" should read -- Sep. 19, 2000 --.

Column 2, line 65, "bead" should read --head--.

Column 4, line 25, " $10^8$ $\mu m^3$ " should read -- $10^8$ $J/m^3$ --.

Column 5, line 48, "layer 30, the background" should read --layer 30. The background --.

Column 6, line 15, "SAT" should read -- $I_{SAT}$ --.

Column 6, line 21, "AB" should read -- $\Delta B$ --.

Column 6, line 37, "AB" should read -- $\Delta B$ --.

This certificate supersedes Certificate of Correction issued September 5, 2006.

Signed and Sealed this

Seventh Day of November, 2006

JON W. DUDAS
*Director of the United States Patent and Trademark Office*